(No Model.)
C. E. BALL.
LIGHTNING ROD JOINT OR COUPLING.
No. 266,075. Patented Oct. 17, 1882.
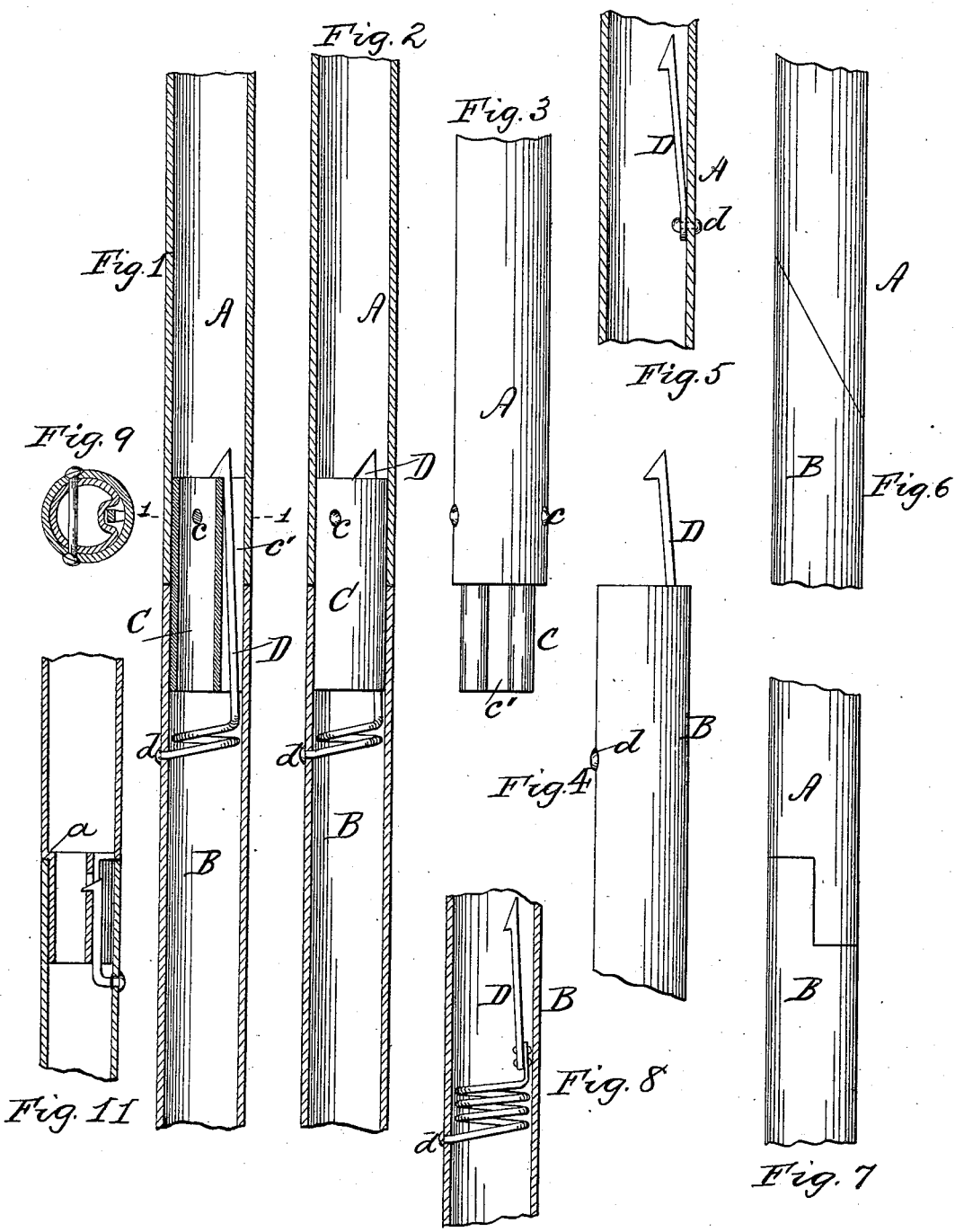
WITNESSES: 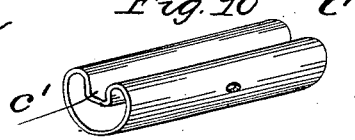 INVENTOR,
Chas. E. Ball
By Connolly Bros.
ATTORNEYS.

UNITED STATES PATENT OFFICE.

CHARLES E. BALL, OF PHILADELPHIA, PENNSYLVANIA.

LIGHTNING-ROD JOINT OR COUPLING.

SPECIFICATION forming part of Letters Patent No. 266,075, dated October 17, 1882.

Application filed February 25, 1882. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Lightning-Rod Joints or Couplings; and I do hereby declare the following to be a full, clear, and exact description of the invention, reference being had to the accompanying drawings, which form part of this specification, in which—

Figures 1 and 2 are vertical sections of my improved joint or coupling. Figs. 3, 4, 6, and 7 are elevations of the same. Figs. 5 and 8 are still other vertical sections. Fig. 9 is a horizontal section on line 1 1, Fig. 1. Fig. 10 is a detail perspective, and Fig. 11 is a vertical section of a modification.

My invention has for its object to provide an improved joint for lightning-rods, whereby the sections composing such rods may be readily coupled together, such coupling serving to stiffen the joint and make a good electrical connection.

My invention has for its further object to provide an expansion-joint for lightning-rods.

My invention consists of a lightning-rod joint composed of a spring latch or catch and thimble, with which said latch engages, and which forms a stiffener and contact-piece.

My improvements further consist in making the joint an expansion one, the rod remaining perfectly plain or smooth on its outside surface.

Referring to the accompanying drawings, A and B represent two sections of a lightning-rod, composed of copper tubing.

C represents the thimble, which is fastened to one of the sections A by a rivet, $c$, or in any other suitable manner. Said thimble is made in the form shown in Fig. 10, and consists of a short piece of pipe with one of its sides indented to produce a groove, $c'$, the opposite or plain side having an external diameter equal to the internal diameter of the pipes A and B, in which it fits.

D represents a spring-latch secured by a rivet, $d$, or in any other suitable manner, to the section B. When the sections A and B are brought together the projecting end of the thimble C enters to the section B, the head of the latch D passing up the groove $c'$ in said thimble and engaging with the upper edge of the latter, as shown in Figs. 1 and 2.

The meeting ends of the sections A and B may be straight, as shown in Figs. 1, 2, and 3, or mitered, as shown in Fig. 6, or rabbeted, as shown in Fig. 7.

To permit expansion and contraction due to variations of temperature, the spring-catch may be coiled, as shown in Figs. 1 and 2, or attached to a coil, as shown in Fig. 8, such coil giving or opening when expansion occurs and closing under contraction of the rod.

Instead of making a separate thimble, as above described, the end of one of the sections may be swaged into the same shape as the thimble and an opening cut into it to receive the head of the latch, such swaged end being shown at $a$, and having an opening, $a'$, Fig. 11.

When the rod-sections are coupled together the thimble affords a stiffener for the joint, and also gives an extended metallic contact, insuring good electrical connection. It also prevents the entrance of moisture, which might affect the conductivity of the joint. The coupling of the sections together is readily effected, and, being once made, cannot be undone or become loose by accident. The expansion-joints are not intended to be employed between all of the sections, but only at intervals, the majority of the joints in the rod having plain catches, as shown in Fig. 5. The coupling parts being wholly inside of the rod, the external surface of the latter is perfectly plain or smooth, like a continuous or unbroken pipe.

What I claim as my invention is—

1. In a lightning-rod, the combination of two sections of a hollow conductor, a thimble attached to one section, and a spring-catch attached to the interior of the other section, the thimble being adapted to project into the section containing the catch and engage therewith, substantially as described.

2. In a lightning-rod composed of tubular sections, the combination, with two such sections, of a thimble having a grooved side and attached to one of said sections, with a spring-catch attached to the interior of the other of said sections, and adapted to pass through the groove in the thimble and engage therewith to secure the sections together, substantially as described.

3. In a lightning-rod composed of tubular sections, the combination, with two such sections, of a spring-catch attached to one section and capable of expansion in the direction of the longitudinal axis of the section, and a thimble attached to the succeeding section of the conductor, constructed, as described, so as to be capable of projecting into the section having the spring-catch and engaging therewith, whereby an expansible joint is formed, substantially as described.

4. In a joint for a tubular conductor, the combination, with the adjoining sections, of a spring-catch, formed with or connected to a coil or spiral attached to one of said sections and a detent attached to the other section, the spring-catch being adapted to project into the section having the detent and engage therewith, thereby forming an expansion-joint, substantially as described.

In testimony that I claim the foregoing I have hereunto set my hand this 24th day of February, 1882.

CHAS. E. BALL.

Witnesses:
S. J. VAN STAVOREN,
CHAS. F. VAN HORN.